United States Patent [19]

Schreiber et al.

[11] 4,318,392
[45] Mar. 9, 1982

[54] CATALYTIC GAS-FIRED FURNACE SYSTEM AND METHOD

[75] Inventors: Richard J. Schreiber; John P. Kesselring, both of Mountain View; Robert M. Kendall, Sunnyvale, all of Calif.

[73] Assignee: Acurex Corporation, Mt. View, Calif.

[21] Appl. No.: 177,368

[22] Filed: Aug. 11, 1980

[51] Int. Cl.³ .............................................. F24H 3/02
[52] U.S. Cl. ............................. 126/110 R; 126/108; 126/116 A; 431/328
[58] Field of Search ............... 126/108, 110 R, 116 R, 126/112, 99 R, 110 C, 99 D, 116 A; 431/328, 329

[56] References Cited

U.S. PATENT DOCUMENTS

| | | | |
|---|---|---|---|
| 2,496,505 | 2/1950 | Thompson | 126/110 R |
| 2,751,900 | 6/1956 | Modine | 126/110 B |
| 2,808,047 | 10/1957 | Jaye et al. | 126/110 R |
| 3,119,439 | 1/1964 | Weiss | 26/91 R |
| 3,191,659 | 6/1965 | Weiss | 431/328 |
| 3,248,099 | 4/1966 | Bratko | 431/329 |
| 3,294,082 | 12/1966 | Norris | 126/110 R |
| 3,785,763 | 1/1974 | Bratko | 431/328 |
| 3,824,064 | 7/1974 | Bratko | 431/328 |
| 4,106,474 | 8/1978 | Hunter et al. | 126/110 R |
| 4,261,326 | 4/1981 | Ihlenfield | 126/110 R |

OTHER PUBLICATIONS

Martin, Evaluation of a Prototype Surface Combustion Furnace, Second Stationary Source Combustion Symposium, vol. III, p. 255, Jul. 1977.

*Primary Examiner*—Daniel J. O'Connor
*Attorney, Agent, or Firm*—Flehr, Hohbach, Test, Albritton & Herbert

[57] ABSTRACT

A gas-fired, forced air furnace system employing a fiber matrix burner element and a condensing-type heat exchanger to achieve both high system thermal efficiency and low emission of $NO_X$ and other gaseous pollutants. The value of excess air in the fuel-air reactants supplied to the ceramic fiber matrix burner is selected to be equal to or greater than ten percent to provide $NO_X$ emissions below fifteen ppm on an air-free basis, with CO and HC emissions substantially comparable to those from existing furnaces, and the surface area of the condensing portion of the heat exchanger system is designed to produce sufficient condensation of moisture in the combustion gasses to produce an overall system thermal efficiency of at least about ninety percent.

13 Claims, 3 Drawing Figures

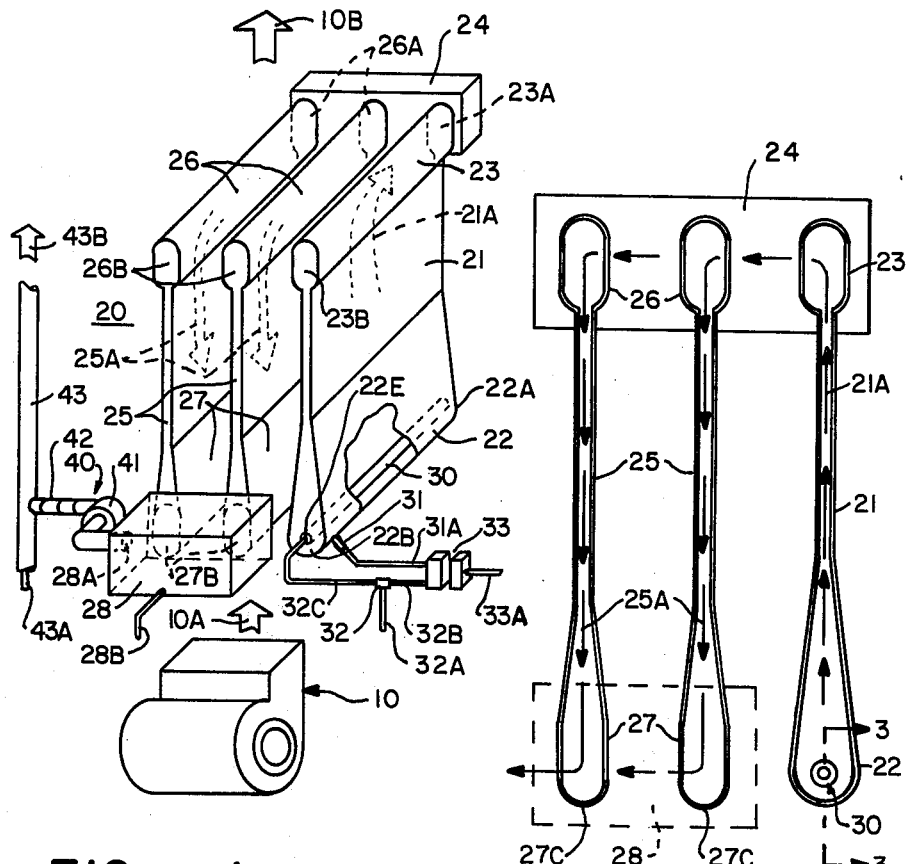
FIG.—1
FIG.—2
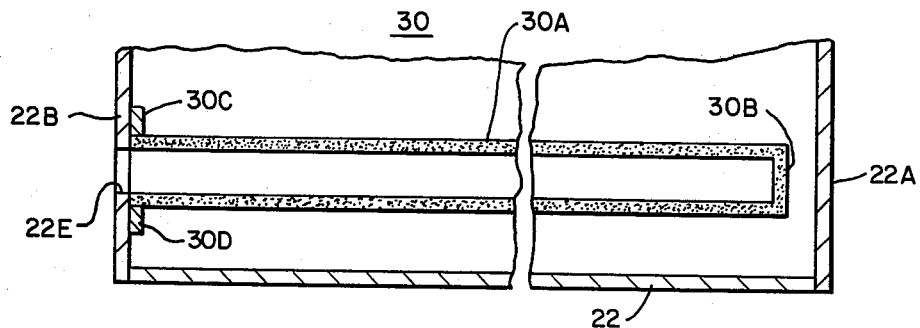
FIG.—3

CATALYTIC GAS-FIRED FURNACE SYSTEM AND METHOD

The invention described herein was made in the course of, or under, a contract with the Southern California Gas Company.

This invention relates in general to catalytic combustion technology, and, more particularly, to residential furnace systems employing catalytic burners and methods for operating such systems.

Conventional, gas-fired residential furnace systems utilize a plurality of open flame burner arrangements in which a natural draft through the inlet manifold is used to provide combustion air and to accomplish fuel and air mixing. The available gas pressure is used to entrain some air and to form a primary air and fuel mixture which is then admitted to the combustion chamber through one or more manifolds. Secondary air to complete combustion is admitted to the combustion chamber around the manifolds. Although the primary air can be controlled to a degree, there is essentially no way to control secondary air. Consequently, the overall excess air in the fuel-air mixture cannot be controlled to a significant degree. Thus under well-adjusted conditions, conventional furnaces operate with excess air in the range of fifty to one hundred percent.

Such conventional residential furnace systems have a maximum steady-state thermal efficiency of around eighty percent. Carbon monoxide and hydrocarbon emissions from such conventional furnaces are about ten parts per million (ppm) and one ppm, respectively. Nitrogen oxide ($NO_x$) emissions range in such furnaces between fifty and one hundred ppm. The burners of such systems can be modified by adding a radiant screen to reduce the $NO_x$ emission level to thirty ppm without affecting carbon monoxide or hydrocarbon emissions. Further reductions in $NO_x$ emissions can be achieved only by adjusting the combustion process (i.e., reducing excess air) which tends to increase emissions of carbon monoxide and hydrocarbons as well as adversely impacting combustion and system thermal efficiency.

Residential gas fired, forced air furnaces account for well over thirty percent of the residential heaters in use in the United States. The environmental impact of $NO_x$ emissions from such furnaces, while a small percentage of the total mass emissions of $NO_x$, is significant because such $NO_x$ emissions are concentrated in the heating season and are discharged into the atmosphere at near ground level in heavily populated areas. In addition to producing a substantial fraction of the emitted nitrogen oxides, such residential furnaces constitute a substantial usage of natural gas and propane energy resources and substantial benefits could be achieved by increasing the thermal efficiency of such units as well as by minimizing the pollutants emitted therefrom.

One approach that has been taken in the prior art to improving the thermal efficiency of the residential gas-forced air furnace is to incorporate a condensing heat exchanger section in the heat exchanger-burner arrangement of the unit. Such a condensing heat exchanger section cools the combustion products below the dewpoint of the moisture in the flue gas causing such moisture to condense and release its latent heat of vaporization. This increases the efficiency of the overall furnace but itself creates an adverse environmental impact. The condensate collected in the condensing heat exchanger section will contain nitric acid due to the $NO_x$ content of the flue gas and disposal of this condensate may be a problem.

Another approach suggested by the prior art is to utilize a modified combustion chamber which utilizes a refractory matrix burner with the premixed fuel and air supplied thereto combusting on the surface region of the matrix without visible flame. In order to achieve high efficiency with such burner used in conjunction with a conventional heat exchanger, excess air had to be maintained at a percentage value of around ten or fifteen percent. With such a decreased value of excess air the level of $NO_x$ emitted increases due to the increased fuel supply which increases the surface temperature of the matrix burner which in turn increases the generation of thermal $NO_x$. While the prior art generally suggests the possibility of combining a refractory matrix burner arrangement with a condensing heat exchanger unit, optimum furnace designs producing both high system efficiency (i.e., at least about ninety percent) and low $NO_x$ emission (i.e., substantially below 15 ppm) have not been disclosed.

Accordingly, it is the general object of this invention to provide a new and improved residential gas-fired furnace system and method providing high combustion efficiency, high overall system thermal efficiency and low thermal $NO_x$ emission.

It is another object of this invention to provide a residential gas-fired furnace system utilizing both a condensing-type heat exchanger and a ceramic fiber matrix burner element with operating parameters optimized to achieve $NO_x$ emission levels substantially below 15 ppm, CO and HC emissions comparable to existing furnaces, and steady-state thermal system efficiency of at least about ninety percent.

In accordance with one aspect of this invention, the above-stated objects are achieved in a gas-fired, forced air furnace system of the type in which a heat exchanger is disposed in a stream of air to be heated and which includes a first heat exchanger section disposed in the stream of air and including a combustion chamber containing a fiber matrix element and means for igniting a gas-air mixture supplied to the chamber to burn across the surface of the burner element to produce both radiant heating of the combustion chamber wall portions and convection heating of other wall portions of the first heat exchanger section. A fuel supply means supplies the burner element with a gas-air mixture having preselected values of excess air and heat input. A second, counterflow, heat exchanger section is disposed in the stream of air and includes means connecting the second heat exchanger section with the first heat exchanger section to communicate combustion products therebetween for producing convection heating of the walls of the second heat exchanger section. The second heat exchanger section has a surface area of a magnitude preselected in accordance with the preselected value of excess air and heat input to produce sufficient condensation of moisture in the combustion gasses to provide a steady-state thermal efficiency for the system of at least about ninety percent.

In accordance with another aspect of this invention, the above-stated objects are achieved in a method of operating a gas-fired furnace system in which a heat exchanger is disposed in a stream of air to be heated, which method involves the following steps:

disposing in the stream of air substantially closed combustion chamber containing a ceramic fiber matrix burner element;

supplying to the burner element a gas-air mixture having a percentage of excess air preselected to be substantially greater than ten percent to produce an emission level of nitrogen oxides substantially less than fifteen ppm when burned on said burner element;

igniting the gas-air mixture to cause burning thereof across the surface of the burner element to produce radiant heating of the walls of the combustion chamber;

disposing in the stream of air a counterflow heat exchanger having a wall surface area of a magnitude sufficient to produce substantial condensation of moisture in the combustion product from the combustion chamber and to produce an overall system of thermal efficiency of at least about ninety percent;

passing combustion products from said combustion chamber through the heat exchanger; and venting the residual combustion products from the heat exchanger to the outside atmosphere.

Since this invention provides a residential furnace system having an emission level of nitrogen oxides substantially less than fifteen parts per million in conjunction with a condensing heat exchanger section, the problem of nitric acid pollution in the condensate is substantially reduced. Consequently, the system and method of this invention drastically reduces the environmental pollution caused by residential gas-fired furnace systems while simultaneously contributing to more efficient use of the increasingly scarce supplies of natural gas.

Other objects, features and advantages of this invention will be apparent from a consideration of the following detailed description in conjunction with the accompanying drawings.

FIG. 1 is a schematic perspective view of a gas-fired furnace system in accordance with this invention.

FIG. 2 is a section view through the heat exchanger and burner assembly depicted in FIG. 1.

FIG. 3 is a partial section view of the combustion burner assembly taken along the lines 3—3 in FIG. 2.

As shown in FIG. 1 the gas-fired furnace system of this invention involves the disposition of a heat exchanger and burner assembly 20 in a stream of air emanating from a circulating air fan 10. This is a conventional arrangement of a forced air, gas-fired residential furnace system, but it will be appreciated that the heat exchanger-burner assembly 20 is substantially different from the corresponding unit in a conventional furnace. Referring to both FIGS. 1 and 2, it will be seen that the heat exchanger-burner assembly 20 of this invention involves a first heat exchanger section comprised of an active heat exchanger-burner unit 21 and a second heat exchanger section involving two condensing, counterflow heat exchanger units 25. Heat exchanger-burner unit 21 is comprised of a generally rectangular heat exchanger body with a generally cylindrical combustion chamber 22 formed on a bottom portion thereof and a generally cylindrical combustion gas exit channel formed on a top portion thereof. Within combustion chamber 22, an elongated, cylindrical burner element 30 is mounted such that the walls of the cylindrical burner element are concentric with the walls of the combustion chamber. Burner element 30 is formed of a ceramic fiber matrix and will be described in greater detail below in connection with FIG. 3. The back wall 22A of combustion chamber 22 is closed and the front wall 22B has a fuel entry port 22E formed therein. Combustion chamber 22 is thus closed to the atmosphere. A conventional pilot light or silicon carbide (glow plug) igniter assembly 31 is mounted in the front end of burning chamber 22.

Combustion gas exit channel 23 has a closed front wall 23B and an exit port 23A at the rear wall thereof communicating with a corresponding port in an inlet manifold 24. Accordingly, combustion gasses emanating from burner element 30 will pass upward through the rectangular body of heat exchanger unit 21, into the combustion gas exit channel 23 and thence outwardly through the exit port 23A into inlet manifold 24.

As shown in FIG. 1, a gas-air mixing chamber 32 is provided for supplying a reactant fuel mixture through an outlet line 32C to the burner element 30. Mixing chamber 32 has a fuel inlet 32B through which it is supplied with natural gas or propane and an air inlet 32A through which it is supplied with ambient air. A standard complement of main and pilot burner valves, regulators and controls, generally designated 33, is provided for controlling the supply of natural gas to the gas-air mixing chamber 32 and the igniter assembly 31. The igniter assembly 31 and the valves and regulators 33 are standard furnace components that need not be depicted nor described in detail.

The two separate counterflow heat exchanger units 25 which form the second heat exchanger section are essentially identical in configuration and each consists of a rectangular heat exchanger body with a generally cylindrical combustion gas entrance channel 26 formed on a top portion thereof and a generally cylindrical combustion gas exit channel 27 formed on a bottom portion thereof. Combustion gas entrance channels 26 have entrance ports 26A communicating with corresponding ports in inlet manifold 24 at the rear of the heat exchanger assembly and have closed ends 26B at the front of the heat exchanger assembly. The combustion gas exit channels are closed at the rear of the heat exchanger assembly 20 and have combustion gas exit ports 27B at the front of the heat exchanger assembly 20 which communicate with ports in outlet manifold 28. The walls of the heat exchanger units 25 are preferably fabricated from stainless steel or coated on the inside with a corrosion resistant material to prevent corrosion from the condensate collected thereon.

Accordingly, as depicted in FIGS. 1 and 2, the combustion gasses which rise along the path 21A through heat exchanger unit 21 are received by inlet manifold 24 via the combustion gas exit channel 23 and are communicated to both of the combustion gas entrance channels 26 of the heat exchanger units 25 in the second heat exchanger section. Thereafter, the combustion gasses flow downward through the second heat exchanger units 25 along the paths designated 25A and are communicated through the combustion gas exit channels 27 into outlet manifold 28. The bottom portions 27C (FIG. 2) of the combustion gas exit channels 27 slope downward from the rear end to the front end (or vice versa) of the heat exchanger assembly in order that the condensation products which form on the walls of the heat exchanger units 25 may be drained off by an appropriate drain channel (not shown). It should be apparent that this drain channel may be formed either in the bottom of individual heat exchanger units 25 or the condensate may be collected in the outlet manifold and eliminated via a single condensate drain 28B provided therein.

Once the combustion gasses have entered the outlet manifold 28 they are communicated via an outlet port 28A to an induced draft and flue arrangement 40. The induced draft and flue arrangement 40 includes a draft blower 41, an outlet damper 42, and a flue 43. Draft blower 41 may be any conventional centrifugal blower driven by a relatively low horsepower motor. The outlet damper 42 may be a conventional manually setable damper arrangement or may consist of an automatically operated damper which is closed when the furnace is not operating and opens to a prearranged position just prior to operation of the furnace. The flue 43 is a standard flue arrangement with the exception of a condensate drain 43A which is provided in the bottom portion thereof for draining out any condensate formed in the flue 43. The combustion gas products exit from the flue 43 in a stream of gasses 43B which dissipate in the outside atmosphere.

Referring now to FIG. 3, the general constructional details of a burner element 30 are depicted. Burner element 30 consists of an elongated, hollow cylindrical shell 30A having a closed rear end 30B and an open front end 30D. The shell 30A is mounted on a mounting flange 30C which is attached to the front wall 22B of combustion chamber 22 by any conventional means. The cylindrical burner shell 30A and the closed end 30B are comprised of a matrix of high temperature resistant ceramic fibers which may include catalytic fiber strands interspersed throughout at least an outer layer of the matrix. The interstitial spaces between the fibers form a flow path for the gas-air mixture which enters at the open end 30D and diffuses radially through the fibers. Preferably the fibers in the matrix are packed to a density in the range of about twelve to sixteen pounds per cubic foot so that the combustion of the gas-air mixture will be sustained at a heterogeneous reaction zone along at least a portion of the outer layer of the matrix. In this manner the invention utilizes the general concepts described in copending Kesselring et al U.S. Patent Application, Ser. No. 164,831 filed June 30, 1980.

A burner matrix suitable for use in this invention may comprise a wrapped pad of Cerablanket (also called a Cerachrome blanket) which consists primarily of alumina silicate fibers and is sold by The Johns-Manville Company and is provided with a density of about twelve pounds per cubic foot. In addition to using a wrapped blanket approach, the same fiber material may be formed into the desired cylindrical shell shape by using a wet slurry of the fibers and conventional vacuum forming techniques. The catalytic activity of the burner pad is preferably improved by the addition of materials having a higher degree of catalytic activity, for example strands of catalytic metals such as chrome wire interspersed through at least the surface regions of the matrix. In addition, the matrix can be formed in two or more separate layers each having different densities or different compositions. Thus, for assisting in preventing any flashback of the combusting reactants, the layer on the upstream side could be formed of a composition which is less catalytic than the downstream layer, and the strands of catalytic metal could be provided only in the downstream layer. Also, the upstream layer may have a lower thermal conductivity than the downstream layer. The above-referenced Kesselring application discusses the general theory of operation of a fiber matrix burner element and this discussion is hereby incorporated by reference.

In the above description the overall operation of the furnace system of FIG. 1 should be apparent. In accordance with this invention, a novel approach is utilized in operating the furnace system disclosed in order to achieve, simultaneously, low emission of $NO_X$ in the combustion products emanating from the burner element 30 and high overall system thermal efficiency. Accordingly, the gas-fired forced air furnace system depicted in FIG. 1 is adjusted to provide a fuel-air mixture to burner 30 having an excess air level of about ten percent in order to keep $NO_X$ emissions in the combustion products from the burner at a level substantially below fifteen ppm on an air-free basis. In addition, the total surface area of the second heat exchanger section involving the two counterflow heat exchanger units 25 is preselected in accordance with the preselected value of excess air to produce sufficient condensation of the moisture in the combustion gasses as they pass through the second heat exchanger section to provide a steady-state thermal efficiency for the overall system of at least about ninety percent. One way of controlling the value of excess air in the fuel-air mixture burned at burner 30 is to control the setting of damper 42 since the setting of damper 42 controls the flow rate of combustion gasses through the system and thus controls the volume of air which is drawn into the gas-air mixing chamber 32 through the air inlet 32A.

Other ways of controlling the value of excess air in the fuel-air mixture burned at burner 30 could be provided. For example, a small forced air blower could be attached to the air inlet 32A of the fuel-air mixing chamber 32 with appropriate means to control the flow rate of the air entering the mixing chamber 32 in order to control the flow rate through the system. Or, the induced draft 41 may be provided with a variable speed drive motor.

Overall thermal efficiency of at least about ninety percent for the system of FIG. 1 is achievable in accordance with this invention due to the combined effect of radiant heat transfer from the burner element 30 to the walls of combustion chamber 22 and the release of the latent heat of vaporization achieved by providing substantial condensation of the moisture in the combustion gasses as they pass down through the two heat exchanger units 25 of the second heat exchanger section. Specifically, this involves providing sufficient heat transfer area in the second heat exchanger section in order to cool the combustion gasses to an exhaust temperature in the range of about 120°–130° F. so that the moisture in the combustion gasses will condense on a substantial portion of the walls of the second heat exchanger section, i.e., the temperature of the combustion gasses will be below the dewpoint thereof throughout a substantial wall area of the second heat exchanger section. Design of a particular furnace system to implement this general principle can readily be achieved by simple experimentation using various levels of excess air and making appropriate measurements of system performance.

The principles of this invention have been demonstrated in a prototype furnace in which each of the heat exchangers is about eighteen inches wide and twenty-six inches high to provide a heat exchange surface area of about seven square feet per heat exchanger. The burner element 30 was constructed about twelve and one-half inches long and one and one-half inches in diameter with a one-quarter inch wall thickness. The following table of test data illustrates the operating parameters of this prototype furnace:

| HEAT INPUT | |
|---|---|
| KBtu/hr | 25 |
| KBtu/hr per ft² of burner exterior area | 60 |
| THEORETICAL AIR, % | 149 |
| FUEL FLOW RATE, SCFM | 0.42 |
| AIR FLOW RATE, SCFM | 6.25 |
| PRESSURE | |
| Reactants, psig | 2 |
| Burner $\Delta$ P, W.G. | |
| Hot | 4.8 |
| Cold | 4 |
| TEMPERATURE, °F. | |
| H.E. Lower Area | 194 |
| H.E. Middle Area | 277 |
| H.E. Highest Area | 459 |
| Hi Exhaust (before entering units 25) | 485 |
| Lo Exhaust (leaving units 25) | 122 |
| Inside Burner | 77 |
| Burner Surface | 1700 |
| Ambient | 66 |
| Heated Air | 107 |
| EMISSIONS AS MEASURED | |
| $CO_2$, % | 7.9 |
| $O_2$, % | 6.4 |
| CO ppm | <10 |
| HC, ppm | <1 |
| $NO_X$, ppm | 7 |
| NO, ppm | 5 |
| $NO_2$, ppm | 2 |
| EMISSIONS AIR-FREE | |
| Correction Factor | 1.52 |
| $NO_X$, ppm | 10.6 |
| CO, ppm | 15.2 |
| HC, ppm | 1.52 |
| EFFICIENCY - STEADY-STATE | |
| m, lb/hr | 29.87 |
| $\Delta$T, °F. | 55.8 |
| Dry Heat Loss, Btu/hr | 417 |
| Condensate, lb/hr | .788 |
| Latent Heat Loss, Btu/hr | 1871 |
| Efficiency, % | 91 |

It will be noted that the value of excess air in this case was 49%. The temperature of exhaust gasses leaving the second heat exchanger section (i.e., at the outlet manifold 28) was 122° F. which is well below the dewpoint of the gasses in the combustion product. The level of $NO_X$ in the emissions was 10.6 ppm which is substantially below 15 ppm. This low level of emissions was achieved together with a steady-state efficiency of about 91%. These two measured values correspond favorably with a $NO_X$ emission rate of 80–100 ppm in a conventional furnace which is only about 80% efficient. Accordingly, it will be appreciated that the furnace system in accordance with this invention simultaneously provides a substantial improvement in the overall thermal efficiency of the furnace while reducing the $NO_X$ emissions by about an order of magnitude.

The test data in the above table shows a temperature rise for the air passing over the heat exchanger sections of only about forty-one degrees, whereas conventional furnaces provide a temperature rise of 70° F. to 80° F. It should be understood that the above data was for a prototype in which only one burner and corresponding heat exchanger sections were provided. To provide the desired amount of total heat output from the furnace, additional burner and heat exchanger sections can be provided. In such systems with plural burner and heat exchanger arrangements, the appropriate modifications to the inlet and outlet manifolds and the flue arrangement will be necessary, but such changes will be readily implemented by persons of skill in the residential furnace art.

Generally, it is believed that the preferred range for the value of excess air will be about ten to fifty percent in order to maintain the $NO_X$ level substantially below 15 ppm for preferred heat input levels of about 60 KBtu/hr per square foot of exterior burner area. Generally, as the level of excess air is reduced, the amount of heat exchanger surface area is reduced for the same overall heat input since the volume of combustion gasses to be cooled is lowered. The selected level of excess air must also take into account the thickness of the fiber matrix burner element to insure that the flashback or preignition does not occur.

While the system and method of this invention have been described in conjunction with a particular preferred embodiment, it should be apparent that numerous changes could be made without departing from the principles of this invention. For example, instead of utilizing an arrangement of first and second heat exchanger sections such as shown in FIG. 1 with a general parallel arrangement, it would be possible to provide a heat exchanger unit in which the various sections are arranged in a concentric fashion. In addition, instead of including the combustion chamber 22 as an integral part of the first heat exchanger section 21, it would be possible to utilize a physically separate combustion chamber with the combustion products communicated via a short plenum to the heat exchanger sections. It is important, however, that the combustion chamber be positioned in the stream of air to be cooled in order to take full advantage of the radiant heat transfer to the walls of the combustion chamber by the burner element. If a separate combustion chamber were utilized, an alternative configuration would be to provide two heat exchanger units in the first heat exchanger section, each being fed with a portion of the combustion products from the combustion chamber and a single condensing heat exchanger element in the second heat exchanger section. However, the arrangement depicted in FIG. 1 is generally preferred since it involves a more simple adaptation of a conventional furnace system and achieves the performance improvements in accordance with the principles of this invention at relatively low cost.

In addition to the possible modifications set forth above, it should be apparent that the system and method of this invention are adaptable to a furnace system employing a plurality of combustion chambers, burner elements, and related heat exchanger sections, in order to achieve a furnace system of desired overall heat output. Numerous modifications in addition to those suggested above could thus be made without departing from the principles of this invention as claimed in the following claims.

What is claimed:

1. In a gas-fired, forced air furnace system of the type in which a heat exchanger is disposed in a stream of air to be heated, a first heat exchanger section disposed in said stream of air and including a combustion chamber containing a ceramic fiber matrix burner element, and igniting means for igniting a gas-air mixture supplied to said chamber to burn across the surface of said burner element to produce both radiant heating of the combustion chamber wall portions and convection heating of other wall portions of said first heat exchanger section;

fuel supply means for supplying said burner element with a gas-air mixture having preselected values of excess air and heat input level; and a second, counterflow, heat exchanger section disposed in said stream of air including means connecting said second heat exchanger section with said first heat exchanger section to communicate combustion products therebetween for producing convection heating of the walls of said second heat exchanger section, said second heat exchanger section having a surface area of a magnitude preselected in accordance with said preselected values of excess air and heat input to produce sufficient condensation of moisture in said combustion gasses to provide a steady state thermal efficiency for said system of at least about ninety percent.

2. Apparatus as claimed in claim 1, wherein said value of excess air is equal to or greater than ten percent to provide an emission level of nitrogen oxides in combustion products from said chamber substantially less than fifteen parts per million (on an air-free basis) and said heat input level is preselected in accordance with the combustion surface area of said fiber matrix burner element to be substantially about 60,000 to 100,000 Btu/hr per square foot of burner exterior area and with emissions of CO and HC substantially comparable to existing furnace emissions.

3. Apparatus as claimed in claim 2, wherein said preselected value of excess air is in the range of ten to fifty percent.

4. Apparatus as claimed in claim 1, wherein said first heat exchanger section comprises a hollow, generally rectangular body with a first generally cylindrical chamber formed on the bottom portion thereof to serve as said combustion chamber and a second generally cylindrical chamber formed on a top portion thereof to serve as an exit channel for combustion products; said burner element comprises an elongated, hollow cylindrical shell concentrically disposed within said combustion chamber and comprised of a matrix of high temperature resistant ceramic fibers including catalytic fiber strands interspersed throughout at least an outer layer of said matrix, with interstitial spaces between said fibers forming a flow path for said gas-air mixture and with said fibers packed to a density in the range of twelve to sixteen pounds per cubic foot so that combustion of said gas-air mixture is sustained at a heterogeneous reaction zone along at least a portion of said outer layer of said matrix; said igniting means comprises a pilot burner and igniter assembly mounted in said first chamber adjacent said cylindrical shell; said second heat exchanger section comprises at least a pair of hollow, generally rectangular bodies disposed parallel to said first-mentioned generally rectangular body, each having a first generally cylindrical chamber formed on a top portion thereof to serve as an entrance channel for combustion products and a second generally cylindrical chamber formed on a bottom portion thereof to serve as an exit channel for combustion products, said connecting means comprising an inlet manifold communicating among said top cylindrical chambers of both said first and second heat exchanger sections; at least the interior walls of said pair of rectangular bodies of said second heat exchanger section being formed of a material having substantial resistance to corrosion from condensation products formed on said walls.

5. Apparatus as claimed in claim 4, further comprising a flue and manifold arrangement for exhausting combustion products from said exit channels of said second heat exchanger section to the outside atmosphere; and said fuel supply means comprises a gas-air mixing chamber having a first inlet port communicating with a supply of ambient air and a second inlet port communicating with a supply of gas and an outlet port communicating with said burner element, and a blower and damper arrangement mounted in said flue and manifold arrangement for controlling the amount of air drawn into said air-gas mixing plenum and for assisting in exhausting combustion products from said exit channels.

6. In a gas-fired, forced air furnace system of the type in which a heat exchanger is disposed in a stream of air to be heated, a first heat exchanger section disposed in said stream of air and including a combustion chamber comprising a ceramic fiber matrix burner element, a fuel entry port for communicating a gas-air mixture to said burner element, and means for igniting said gas-air mixture to burn across the surface of said burner element to produce both radiant and convection heating of the walls of said first heat exchanger section;

a second heat exchanger section disposed in said stream of air and connected with said first heat exchanger section to receive combustion products therefrom for producing convection heating of the walls of said second heat exchanger section; and fuel supply means for supplying a gas-air mixture to said fuel entry port, including means for setting the excess air level in said gas-air mixture to a preselected value equal to or greater than ten percent to provide an emission level of nitrogen oxides in combustion products emanating from said combustion chamber substantially less than fifteen parts per million on an air-free basis, with CO and HC emissions substantially comparable to those in existing furnaces; said second heat exchanger section being constructed with a wall surface area of a magnitude preselected in accordance with said preselected value of excess air to produce sufficient condensation of moisture in said combustion gasses to provide a steady state thermal efficiency for said system of at least about ninety percent.

7. Apparatus as claimed in claim 6, wherein said combustion chamber comprises an elongated, generally cylindrical chamber; and said burner element comprises an elongated, hollow cylindrical shell concentrically disposed within said cylindrical chamber and comprised of a matrix of high temperature resistant ceramic fibers which may include catalytic fiber strands interspersed throughout at least an outer layer of said matrix, with interstitial spaces between said fibers forming a flow path for said gas-air mixture and with said fibers packed to a density in the range of twelve to sixteen pounds per cubic foot so that combustion of said gas-air mixture is sustained at a heterogeneous reaction zone along at least a portion of said outer layer of said matrix.

8. In a gas-fired, forced-air furnace system of the type in which a heat exchanger is disposed in a stream of air to be heated, a gas burner comprising a substantially closed combustion chamber disposed in said stream of air, a fiber matrix burner element disposed in said combustion chamber, a fuel supply means for communicating a gas-air fuel mixture having a preselected value of excess air to said burner pad, ignition means for igniting said gas-air mixture to burn across the surface of said burner pad to produce radiant heating of the walls of said combustion chamber, and a combustion product exit port;

a first heat exchanger section disposed in said stream of air and having exit and entrance ports at opposite ends thereof, said entrance port communicating with said exit port of said combustion chamber for receiving combustion products to produce convection heating of the walls of said first heat exchanger section;

a second heat exchanger section disposed in said stream of air and having entrance and exit ports at opposite ends thereof, said entrance port communicating with said exit port of said first heat exchanger section for receiving combustion products to produce convection heating of the walls of said second heat exchanger section; a flue system having an entrance port communicating with said exit port of said second heat exchanger section and an exit port communicating with the outside atmosphere for exhausting residual combustion gasses from said second heat exchanger section;

said preselected value of excess air being chosen to be equal to or greater than ten percent to provide an emission level of nitrogen oxides in combustion products from said combustion chambers substantially less than fifteen parts per million on an air-free basis, with CO and HC emissions substantially comparable to those in existing furnaces, said walls of said first and second heat exchanger sections being constructed with a surface area of a magnitude preselected in accordance with said preselected value of excess air to produce sufficient condensation of moisture in said second heat exchanger section to provide a steady-state thermal efficiency for said system of at least about ninety percent, said flue system including a blower means for assisting in exhausting residual combustion gasses from said second heat exchanger section through said flue system.

9. Apparatus as claimed in claim 8, wherein said combustion chamber comprises an elongated, generally cylindrical chamber; and said burner element comprises an elongated, hollow cylindrical shell concentrically disposed within said cylindrical chamber and comprised of a matrix of high temperature resistant ceramic fibers which may include catalytic fiber strands interspersed throughout at least an outer layer of said matrix, with interstitial spaces between said fibers forming a flow path for said gas-air mixture and with said fibers packed to a density in the range of twelve to sixteen pounds per cubic foot so that combustion of said gas-air mixture is sustained at a heterogeneous reaction zone along at least a portion of said outer layer of said matrix.

10. In a gas-fired, forced air furnace system of the type in which a heat exchanger and burner arrangement is disposed in a stream of air to be heated, a heat exchanger-burner assembly disposed in said stream of air and comprised of a hollow, generally rectangular heat exchanger body with a generally cylindrical combustion chamber formed in a bottom portion thereof and a generally cylindrical combustion gas exit channel formed on a top portion thereof, an elongated, cylindrical burner element concentrically mounted within said combustion chamber and formed of a fiber matrix with a fuel entry port provided in one end thereof, and an igniter assembly mounted in said combustion chamber adjacent said fuel entry end of said burner element;

a condensing heat exchanger assembly disposed in said stream of air parallel to and closely adjacent to said heat exchanger-burner assembly and comprised of at least a pair of hollow, generally rectangular heat exchanger bodies each having a generally cylindrical combustion product entrance channel formed on a top portion thereof and a generally cylindrical combustion product exit channel formed on a bottom portion thereof, and an inlet manifold connecting both said entrance channels with said exit channel of said heat exchanger-burner assembly;

a fuel supply assembly for supplying a gas-air mixture to said fuel entry port and comprised of a gas-air mixing chamber having a first inlet port communicating with a supply of ambient air and a second inlet port communicating with a supply of gas and an outlet port communicating with said fuel entry port of said burner element; and a manifold and flue assembly comprised of a flue communicating with the outside atmosphere, an outlet manifold connecting both said exit channels of said condensing heat exchanger assembly with said flue, and a draft-inducing arrangement mounted within said outlet manifold or said flue for assisting in exhausting combustion products from said exit channels into the outside atmosphere.

11. The system of claim 10, wherein said draft-inducing arrangement has a preset air flow rate to produce a gas-air mixture having a value of excess air equal to or greater than ten percent and preselected in accordance with the heat input level to said burner element to produce an emission level of nitrogen oxides from said system substantially less than fifteen parts per million on an air-free basis, with CO and HC emissions substantially comparable to those in existing furnaces; and said condensing heat exchanger assembly is provided with a wall surface area of a magnitude preselected in accordance with said values of excess air and heat input to produce sufficient condensation of moisture in said combustion gasses to provide a steady-state thermal efficiency for said system of at least about ninety percent.

12. Apparatus as claimed in claim 11 wherein said heat input level is preselected in accordance with the combustion surface area of said fiber matrix burner element to be substantially about 60,000 to 100,000 Btu/hr per square foot of burner exterior area, and said preselected value of excess air is in the range of ten to fifty percent.

13. The system of claim 10, wherein said ceramic fiber matrix comprises a matrix of high temperature resistant fibers including catalytic fiber strands interspersed throughout at least an outer layer of said matrix with interstitial spacing between said fibers forming a flow path for said gas-air mixture and with said fibers packed to a density in the range of twelve to sixteen pounds per cubic foot so that combustion of said gas-air mixture is sustained at a heterogeneous reaction zone along at least a portion of said outer layer of said matrix.

* * * * *